United States Patent [19]

Dupont et al.

[11] Patent Number: 5,728,471
[45] Date of Patent: Mar. 17, 1998

[54] SODA-LIME GREY GLASS

[75] Inventors: Camille Dupont, Heppignies; Daniel D'Hont, Maffle, both of Belgium

[73] Assignee: Glaverbel, Brussels, Belgium

[21] Appl. No.: 712,677

[22] Filed: Sep. 13, 1996

Related U.S. Application Data

[63] Continuation of Ser. No. 434,921, May 4, 1995, abandoned.

[30] Foreign Application Priority Data

May 11, 1994 [LU] Luxembourg ............................. 88486

[51] Int. Cl.$^6$ ...................................................... B32B 17/06
[52] U.S. Cl. ........................... 428/432; 428/220; 428/426; 428/701; 428/702; 501/68; 501/69; 501/70; 501/71; 296/218
[58] Field of Search ................................ 428/426, 432, 428/699, 701, 702, 220; 501/27, 68, 69, 70, 71; 296/218

[56] References Cited

U.S. PATENT DOCUMENTS

| | | | |
|---|---|---|---|
| 4,104,076 | 8/1978 | Pons | 106/52 |
| 5,023,210 | 6/1991 | Krumwiede et al. | 501/71 |
| 5,352,640 | 10/1994 | Combes | 501/71 |
| 5,393,593 | 2/1995 | Gulotta | 428/220 |

FOREIGN PATENT DOCUMENTS

| | | |
|---|---|---|
| 0349909 | 1/1990 | European Pat. Off. . |
| 0482535 | 4/1992 | European Pat. Off. . |
| 0536049 | 4/1993 | European Pat. Off. . |
| 2082459 | 12/1971 | France . |
| 1352189 | 5/1974 | United Kingdom . |

OTHER PUBLICATIONS

"Colorimetry" Official Recommendations of the International Commission on Illumination. May, 1970, pp. 7–26.

H. Scholtze: "Le Verre"[Glass], Glass–Institute, Paris 1969, pp. 210–217.

DIN 67 507, Lichttransmissionsgrade, Strahlungstransmissionsgrade und Gesamtenergiedurchlassgrade von Verglasungen, Jun. 1980, pp. 1–8.

*Primary Examiner*—Timothy Speer

[57] ABSTRACT

Grey soda-lime glass is composed of main glass-forming constituents together with iron, selenium, cobalt and chromium as colouring agents in the following quantities:

| | |
|---|---|
| $Fe_2O_3$ | 0.5 to 0.9% |
| Co | 0.012 to 0.025% |
| Se | 0.0025 to 0.010% |
| $Cr_2O_3$ | 0.005 to 0.020%. |

The proportions of colouring agents are such that the glass has a light transmission factor (TL) of less than 30% and an excitation purity (P) of less than 12%. The dark grey glass is especially appropriate for installation in the sunroofs of cars.

24 Claims, No Drawings

SODA-LIME GREY GLASS

This application is a continuation of application Ser. No. 08/434,921, filed May 4, 1995, now abandoned.

BACKGROUND OF THE INVENTION

1. Field of the invention

The present invention concerns a grey coloured soda-lime glass comprising a base composition of main glass-forming constituents together with colouring agents.

2. Description of the Related Art

The expression "soda-lime glass" is used here in a broad sense and denotes any glass that contains the following constituents (percentages by weight):

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O3$ | 0 to 5% |
| BaO | 0 to 2% |
| BaO + CaO + MgO | 10 to 20% |
| $K_2O + Na_2O$ | 10 to 20% |

This type of glass is used very widely in the field of glazing for buildings or motor vehicles, for example. It is generally manufactured in the form of a ribbon by a drawing or float process. A ribbon of this type may be cut up in the form of sheets which may then be made curved or subjected to a treatment to reinforce the mechanical properties, for example, heat tempering.

When discussing the optical properties of a sheet of glass, it is generally necessary to relate these properties to a standard illuminant. In the present specification, 2 standard illuminants are used; Illuminant C and Illuminant A as defined by the International Commission on Illumination (C.I.E.). Illuminant C represents average daylight having a colour temperature of 6700 K. This illuminant is especially useful for evaluating the optical properties of glazing panels for buildings. Illuminant A represents the radiation of a Planck radiator at a temperature of about 2856 K. This illuminant represents the light emitted by car headlamps and is essentially used to evaluate the optical properties of glazing panels for motor vehicles. The International Commission on Illumination has also published a document entitled "Colorimetry, Official Recommendations of the C.I.E." (May 1970) which sets out a theory according to which the colorimetric coordinates for the light of each wavelength of the visible spectrum are defined so that they may be represented on a diagram having orthogonal axes x and y called the C.I.E- trichromatic diagram. This trichromatic diagram shows the locus for light of each wavelength (expressed in nanometres) within the visible spectrum. This is known as the "spectrum locus" and the light whose coordinates are situated on this spectrum locus is said to possess a 100% excitation purity for the appropriate wavelength. The spectrum locus is closed off by a line known as the purple line which joins the points of the spectrum locus, the coordinates of which correspond to wavelengths of 380 nm (violet) and 780 nm (red). The area enclosed by the spectrum locus and the purple line is the field available for the trichromatic coordinates of any visible light. The coordinates of the light emitted by Illuminant C, for example, correspond to x=0.3101 and y=0.3163. This point C is taken to represent white light and accordingly has an excitation purity equal to zero for any wavelength. Lines may be drawn from the point C to the spectrum locus at any desired wavelength and any point situated on these lines may be defined not only by its coordinates x and y, but also in terms of the wavelength corresponding to the line on which it is situated and its distance from the point C relative to the total length of the wavelength line. From this, light transmitted by a coloured sheet of glass may be described in terms of its dominant wavelength and its excitation purity expressed in percent.

In fact the C.I.E. coordinates of light transmitted by a coloured glass sheet will depend not only on the composition of the glass but also on its thickness. Throughout this specification including the claims, any value of the trichromatic coordinates (x,y), of the excitation purity P, of the dominant wavelength $\lambda_D$ of the transmitted light, and of the light transmission factor of the glass (TL) are calculated from the specific internal transmission (SIT) of a 5 mm thick glass sheet. The specific internal transmission of a glass sheet is governed solely by the absorption of the glass and can be expressed according to the Beer-Lambert law; SIT= $e^{-EA}$ where A is the absorption coefficient of the glass (in $cm^{-1}$) and E is the thickness of the glass (in cm). As a first approximation, SIT may also be represented by the formula $$(I_3+R_2)/(I_1-R_1)$$

where $I_1$ is the intensity of the incident visible light on the first face of the glass sheet, $R_1$ is the intensity of the visible light reflected by this face, $I_3$ is the intensity of the visible light transmitted from the second face of the glass sheet and $R_2$ is the intensity of the visible light reflected internally by this second face.

In the following specification including the claims, the following are used:

the total light transmission for illuminant A, measured for a thickness of 4 mm (TLA4). This total transmission is the result of integrating the expression:

$$\Sigma T_\lambda E_\lambda S_\lambda / \Sigma E_\lambda S_\lambda$$

between the wavelengths 380 and 780 nm, in which $T_\lambda$ is the transmission at wavelength $\lambda$, $E_\lambda$ is the spectral distribution of illuminant A and $S_\lambda$ is the sensitivity of the normal human eye as a function of the wavelength $\lambda$.

the total energy transmission, measured for a thickness of 4 mm (TE4). This total transmission is the result of integrating the expression:

$$\Sigma T_\lambda E_\lambda / \Sigma E_\lambda$$

between the wavelengths 300 and 2150 nm, in which $E_\lambda$ is the spectral energy distribution of the sun at 30° above the horizon.

the total transmission in the ultraviolet, measured for a thickness of 4 mm (TUVT4). This total transmission is the result of integrating the expression:

$$\Sigma T_\lambda U_\lambda / \Sigma U_\lambda$$

between the wavelengths 280 and 380 nm, in which $U_\lambda$ is the spectral distribution of ultraviolet radiation having passed through the atmosphere, as determined as in DIN standard 67507.

2. Description of the related art

The present invention concerns in particular dark grey glasses with a bluish shade. When the transmission curve of a transparent substance varies hardly at all as a function of the visible wavelength, this substance is described as "neutral grey". In the C.I.E. system, it does not possess a dominant wavelength and its excitation purity is zero. By extension, a body may be considered as grey for which the spectral curve is relatively flat in the visible region but nevertheless exhibits weak absorption bands, enabling a dominant wavelength to be defined and a purity that is low but not zero. The excitation purity of grey glass in accordance with the present invention is less than 12%, preferably less than 5%. Grey glass according to the present invention preferably has a dominant wavelength between 460 and 500 nm, corresponding to a bluish shade. The glass has a dark grey tint corresponding to a light transmission factor of less than 30%.

Grey glasses are generally selected for their protecting properties against solar radiation and their use in buildings is known, especially in very sunny countries. Grey glasses are also used in balcony balustrades or staircases as well as for partial glazing in certain motor vehicles or railway compartments to shield their contents from view. In order to illustrate these known glasses, French patent 2,082,459 in the name of Compagnie de Saint-Gobain may be quoted. According to this patent, it is recommended that a glass be made having a total solar energy transmission less than 50% in which the luminance factor Y lies between 35 and 55% for a glass thickness from 2 to 12 mm (the luminance factor Y corresponds to the TL factor used in the present specification). In particular, for grey glass, the luminance factor Y lies between 35 and 45% in order to ensure a compromise between efficient solar protection and sufficient luminosity in dull weather. Such a glass is suitable for architectural purposes in temperate regions but is insufficient when there is a need for more absorbent glasses, for instance when the interior of a car having a sunroof needs to be protected against solar radiation or dazzle from headlamps at night.

SUMMARY OF THE INVENTION

The present invention concerns a dark grey glass especially appropriate for installation in the sunroofs of cars.

The present invention provides a grey soda-lime glass composed of main glass forming constituents together with colouring agents, characterised in that iron, selenium, cobalt and chromium are present in the glass as colouring agents, in amounts corresponding to the following percentage proportions by weight of the glass:

| | |
|---|---|
| $Fe_2O_3$ | 0.5 to 0.9% |
| Co | 0.012 to 0.025% |
| Se | 0.0025 to 0.010% |
| $Cr_2O_3$ | 0.005 to 0.020% | the proportions of colouring agents being such that the glass has the following light transmitting properties:

light transmission factor (TL) less than 30% excitation purity (P) less than 12%.

We were surprised to observe that a dark grey glass of this type could be obtained with colouring agents the nature and concentration of which are similar to those claimed by French patent 2,082,459. In point of fact the latter teaches that in a soda-lime glass, the presence of iron, cobalt, selenium and chromium colouring agents in the following proportions:

| | |
|---|---|
| $Fe_2O_3$ | 0.2 to 1% |
| CoO | 0.003 to 0.03% |
| Se | 0 to 0.010% |
| $Cr_2O_3$ | 0.003 to 0.020% | leads to a grey glass, the luminance factor of which lies between 35 and 45% (more than 40% according to the examples) and hence a transmission factor TL clearly above 30%.

In fact, glass having broadly similar colour properties can be produced by using nickel as the main colouring agent. The presence of nickel however presents certain disadvantages, especially when the glass has to be produced by the float process. In the float process, a ribbon of hot glass is led along the surface of a bath of molten tin so that its faces become plane and parallel. In order to prevent oxidation of the tin at the surface of the bath, which would lead to entrainment of tin oxide by the ribbon, a reducing atmosphere is maintained above the bath. When the glass contains nickel, this is partially reduced by the atmosphere above the tin bath giving rise to a haze in the glass produced. In addition, nickel present in the glass may form nickel sulphide NiS. This sulphide has various crystalline forms, which are stable within different temperature ranges. Transformation from one of these forms to another creates problems when the glass has to be reinforced by a heat tempering treatment, as is the case in the automotive field and also for certain glazing panels used in buildings (balconies, spandrels, etc.). Glass according to the invention, which does not contain nickel, is thus particularly well adapted to be formed by the float process and also for architectural use or in the field of motor or other vehicles.

The combined presence of iron, cobalt, selenium and chromium colouring agents enables the optical and energy properties of grey glass according to the invention to be controlled. The effects of various colouring agents considered individually for the preparation of a glass are as follows (according to "Glass" by H.Scholtze—translated by J.Le Dû—Glass Institute—Paris):

Iron: Iron is in fact present in almost all commercially produced glasses, either as an impurity, or introduced deliberately as a colouring agent. The presence of $Fe^{3+}$ ions, gives rise to a slight absorption of visible light having a short wavelength (410 and 440 nm) and a very strong absorption band in the ultraviolet (absorption band centred on 380 nm), whereas the presence of $Fe^{2+}$ ions gives rise to a strong absorption in the infrared (absorption band centred on 1050 nm). Ferric ions impart to the glass a mild yellow colour whereas ferrous ions give a stronger blue-green coloration.

Selenium: The $Se^{4+}$ cation has practically no colouring effect, whereas the uncharged element $Se^0$ imparts a pink coloration. The $Se^{2-}$ anion forms a chromophore with ferric ions present and on account of this gives a brownish red colour to the glass.

Cobalt: The group $Co^{II}O_4$ produces an intense blue coloration with a dominant wavelength almost opposite to that imparted by the iron-selenium chromophore.

Chromium: The presence of the group $Cr^{III}O_6$ gives rise to absorption bands at 650 nm and gives a light green colour. Strong oxidation gives rise to the group $Cr^{VI}O_4$ which gives a very intense absorption band at 365 nm and gives a yellow coloration.

The energy and optical properties of glass containing these different colouring agents thus results from a complex interaction between them, each of these colouring agents having a behaviour which depends strongly on its redox state and thus, on the presence of other elements likely to influence this state.

We have noted that when the proportions of cobalt, selenium and chromium colouring agents lie between the limits defined above, they enable the lowest possible total light transmission to be attained, evaluated for illuminant A (TLA4) taking into account the maximum content of 0.9% iron (evaluated in the form of $Fe_2O_3$). Glass according to the invention preferably possesses a total light transmission TLA4 of between 10 and 35% which makes it particularly useful for overcoming dazzle by light from vehicle headlamps when it is used for side and rear windows or in the roof of motor vehicles. When the proportion of cobalt falls below the limits defined above, for example to 100 ppm, and the proportion of chromium falls below the limits defined above, for example to 35 ppm, we have found that the light transmission factor (TL) increases, for example to 33% or more.

The presence of iron and selenium colouring agents within the limits defined above allows a strong absorption in the ultra violet region. Glass according to the invention preferably possesses a total transmission in the ultraviolet region (TUVT4) of less than 14%. This property is particularly advantageous in the automotive field. The lower transmission of ultraviolet radiation avoids or reduces the ageing and discolouration of interior trim in motor vehicles.

The low chromium content of glass in accordance with the invention favourably limits the oxidation phenomenon of iron in the glass. This low content allows one to keep a maximum of iron in the bivalent form, which imparts the glass a high absorption of infrared radiation. The total energy transmission of the glass (TE4) is preferably between 20 and 40%.

The bluish shade of the glass is essentially associated with the combination of cobalt and selenium agents.

In a particularly preferred embodiment of the invention, the grey glass is characterised by the presence of colouring agents in amounts corresponding to the following percentage proportions by weight of glass:

|  |  |
|---|---|
| $Fe_2O_3$ | 0.57 to 0.70% |
| Co | 0.017 to 0.020% |
| Se | 0.005 to 0.008% |
| $Cr_2O_3$ | 0.016 to 0.020% | the proportions of the colouring agents being such that the glass has the following light transmitting properties:

| light transmission factor (TL) | between 16 and 22% |
|---|---|
| excitation purity (P) | less than 6% |

Within these preferred limits, it is possible to obtain a glass of which the total light transmission for illuminant A (TLA4) lies between 20 and 25%, and the total energy transmission (TE4) lies between 30 and 35%.

Glass corresponding to the more restricted concentration range of colouring agents defined above is particularly effective since it combines the properties of low energy transmission and low light transmission which makes it perfectly adequate for being used as sunroofs in motor vehicles or for use in buildings situated in very sunny countries. In its architectural use, its aesthetic properties combine with high energy savings linked with the least demands on air conditioning systems.

Such a glass is preferably used in sheet form, for example at a thickness of 4 or 5 mm for the manufacture of sunroofs, 3 mm for side and rear windows in motor vehicles and more than 4 mm in buildings.

The glasses according to the present invention can be made by conventional methods. As raw materials, either natural materials, recycled glass, slag or some combination thereof may be used. The colorants are not necessarily added in the form shown but it is conventional to give the quantities of added colouring agents, in equivalents in the forms shown. In practice, iron may be added as rouge, cobalt as a hydrated sulphate such as $CoSO_4.7H_2O$ or $CoSO_4.6H_2O$, selenium may be added in the elementary form or as a selenite such as $Na_2SeO_3$ or $ZnSeO_3$, and chromium may be added as a bichromate such as $K_2Cr_2O_7$. Other elements are sometimes present as impurities in the starting materials used for forming the glasses according to the invention, (such as, for example, manganese oxide at a level of the order of 50 ppm) either in the natural materials or in re-cycled glass or slag, but where the presence of such impurities does not take the properties of the glass outside the limits defined above, such glasses are considered to be within the scope of the present invention.

In another advantageous embodiment of the invention, the grey glass is associated with a coating of at least one metal oxide, for example a coating composed of titanium oxide, tin oxide, iron oxide, cobalt oxide, chromium oxide or a mixture of these.

A glass bearing such a coating preferably has, for a thickness of 4 mm, a light transmission factor (illuminant C) less than 15%, an energy transmission factor less than 25%, and a total transmission for ultraviolet less than 5%.

Such a glass has optical and energy properties which are difficult to obtain solely with a bulk coloured glass; these low transmissions can normally only be attained with very large quantities of iron which make the vitrifiable batch difficult to melt.

DESCRIPTION OF THE PREFERRED
EMBODIMENTS

The present invention will be illustrated by the following specific examples of compositions according to the invention.

EXAMPLES 1 to 8

Table I gives the base composition of the glass as well as the constituents of the vitrifiable batch to be melted in order to produce glasses according to the invention (the quantities being expressed in kilogrammes per tonne of vitrifiable batch). Table II gives the colorants to be added to the batch (the quantities being expressed in kilogrammes for 1 tonne of vitrifiable raw materials). Tables IIIa and IIIb give the proportions by weight of colouring agents in the glass produced. These proportions are determined by X-ray fluorescence of the glass and converted into the molecular species shown. Tables IIIa and IIIb also give the optical and energy properties corresponding to the definitions given in the present specification. In these tables, "TLxmm" has the same definition as "TL" but with the thicknesses indicated and not with 5 mm.

Example 7 relates to a glass according to Example 5 on which a layer of iron, cobalt and chromium oxides has been deposited. Such a layer has a thickness of between 35 and 45 nm. It contains, in proportions by weight, 62% of cobalt oxide, 26% of iron oxide and 12% of chromium oxide. Such a layer is easily obtained by pyrolysis of organometallic reagents such as acetylacetonates, on the glass ribbon whilst it is still hot, at the exit from the float tank.

Example 8 relates to a glass according to Example 5 on which a layer of titanium oxide has been deposited to a thickness of between 45 and 50 nm. This layer is deposited by pyrolysis of an organic titanium compound on the hot glass.

TABLE I

BASE GLASS

Analysis of base glass

| | |
|---|---|
| $SiO_2$ | 72.0% |
| $Al_2O_3$ | 0.8% |
| CaO | 8.8% |
| MgO | 4.2% |
| $Na_2O$ | 14.1% |
| $K_2O$ | 0.1% |

Constituents of base glass

| | |
|---|---|
| Sand | 571.3 |
| Feldspar | 29.6 |
| Limestone | 35.7 |
| Dolomite | 162.1 |
| $Na_2CO_3$ | 181.1 |
| Sulphate | 10.1 |
| Nitrate | 10.1 |

TABLE II

| Example No: | 1 | 2 | 3 | 4 | 5 | 6 |
|---|---|---|---|---|---|---|
| Colouring agents (kg) calculated in the form of: | | | | | | |
| $Fe_2O_3$ | 4.77 | 4.94 | 5.19 | 4.66 | 4.85 | 4.81 |
| CoO | 0.18 | 0.18 | 0.19 | 0.18 | 0.19 | 0.19 |
| Se | 0.07 | 0.07 | 0.11 | 0.12 | 0.17 | 0.15 |
| $K_2Cr_2O_7$ | 0.29 | 0.28 | 0.27 | 0.31 | 0.29 | 0.31 |
| Colouring agents (quantity by weight in the glass) calculated in the form of: | | | | | | |
| $Fe_2O_3$ (%) | 0.581 | 0.602 | 0.632 | 0.567 | 0.59 | 0.585 |
| Co (ppm) | 175 | 174 | 182 | 170 | 184 | 182 |
| Se (ppm) | 34 | 32 | 54 | 59 | 86 | 76 |
| $Cr_2O_3$ (ppm) | 181 | 174 | 170 | 194 | 183 | 193 |

TABLE IIIa

Properties of the glass:

| Example No: | 1 | 2 | 3 | 4 |
|---|---|---|---|---|
| TL (%) | 24.1 | 24.4 | 20.9 | 21.7 |
| P (%) | 11.6 | 10.8 | 5.6 | 4.9 |
| $\lambda_D$ (nm) | 480.6 | 481.1 | 481.6 | 481.0 |
| TLA4 (%) | 28.6 | 28.7 | 25.7 | 26.3 |
| TE4 (%) | 35.9 | 35.1 | 32.8 | 33.9 |
| TUVT4 (%) | 11.8 | 10.6 | 7.3 | 10.9 |
| TL 4 mm | 31.7 | 32.0 | 28.3 | 29.0 |
| TL 6 mm | 18.6 | 18.9 | 15.7 | 16.3 |
| TL 12 mm | 3.8 | 3.9 | 2.7 | 2.9 |

TABLE IIIb

Properties of the glass:

| Example No: | 5 | 6 | 7 | 8 |
|---|---|---|---|---|
| TL (%) | 19.8 | 17.8 | 7.8 | 13.3 |
| P (%) | 0.13 | 0.8 | 12.4 | 5.5 |
| $\lambda_D$ (nm) | 494.7 | 478.2 | 580.4 | 578.9 |

TABLE IIIb-continued

Properties of the glass:

| Example No: | 5 | 6 | 7 | 8 |
|---|---|---|---|---|
| TLA4 (%) | 25.0 | 22.9 | — | — |
| TE4 (%) | 36.9 | 33.0 | 24.0 | 31.5 |
| TUVT4 (%) | 6.0 | 6.2 | 1.9 | 3.9 |
| TL 4 mm | 27.6 | 24.9 | 10.7 | 18.4 |
| TL 6 mm | 15.1 | 13.0 | 5.7 | 9.7 |
| TL 12 mm | 2.5 | 1.8 | 0.9 | 1.5 |

EXAMPLES 9 AND 10

Following the procedure described in connection with Examples 1 to 8 above the following glasses were formed and tested for their properties, which were as set out in the following TABLE IV. Example 10 relates to a glass in accordance with Example 9 on which a layer of iron, cobalt and chromium oxides has been deposited as described in connection with Example 7 above.

TABLE IV

Constituents of base glass

| | |
|---|---|
| Sand | 587 |
| Dolomite | 201 |
| $Na_2CO_3$ | 172 |
| $Al(OH)_3$ | 20 |
| Sulphate | 10 |
| Nitrate | 10 |

Colouring agents

| | |
|---|---|
| $Fe_2O_3$ | 5.50 |
| CoO | 0.20 |
| Se | 0.11 |
| $K_2Cr_2O_7$ | 0.30 |

Colouring agents:

| Example No: | 9 | 10 |
|---|---|---|
| $Fe_2O_3$ (%) | 0.655 | 0.655 |
| Co (ppm) | 187 | 187 |
| Se (ppm) | 58 | 58 |
| $Cr_2O_3$ (ppm) | 190 | 190 |

Properties of the glass:

| Example N°: | 9 | 10 |
|---|---|---|
| TL (%) | 17.2 | 6.3 |
| P (%) | 3.2 | 9.1 |
| $\lambda_D$ (nm) | 479.0 | 579.7 |
| TLA4 (%) | 22.3 | — |
| TE4 (%) | 30.9 | 17.9 |
| TUVT4 (%) | 7.1 | 1.5 |
| TL 4 mm | — | 8.9 |

What is claimed is:

1. Grey soda-lime glass having a dark grey color, comprising:

soda-lime glass comprised of conventional glass-forming constituents; and coloring agents comprised of iron, cobalt, selenium, and chromium in amounts, based on the weight of the glass, of:

from 0.5 to 0.9% of $Fe_2O_3$;

from 0.012 to 0.025% of Co;

from 0.0025 to 0.010% of Se; and from 0.005 to 0.020% of $Cr_2O_3$.

wherein the glass has light transmitting properties including a light transmission factor (TL) of less than 30% for a glass thickness of 5 mm, and an excitation purity (P) of less than 12%.

2. The grey soda-lime glass according to claim 1, wherein the glass has a total light transmission, measured for a glass thickness of 4 mm with illuminant A (TLA4), which ranges from 10 to 35%.

3. The grey soda-lime glass according to claim 1, wherein the glass has a total energy transmission, measured for a glass thickness of 4 mm (TE4), which ranges from 20 to 40%.

4. The grey soda-lime glass according to claim 1, wherein the glass has a dominant wavelength which lies between 460 and 500 nm.

5. The grey soda-lime glass according to claim 1, wherein the glass has an total ultraviolet transmission, measured for a glass thickness of 4 mm (TUVT4), which is less than 14%.

6. The grey soda-lime glass according to claim 1, wherein the glass is a sheet of glass.

7. The grey soda-lime glass according to claim 6, further comprising a coating layer consisting of at least one metal oxide provided on at least one surface of the sheet of glass to provide a coated glass sheet.

8. The grey soda-lime glass according to claim 7, wherein the coated glass sheet has, for a coated glass sheet thickness of 4 mm, a light transmission factor of less than 15% (illuminant C), an energy transmission factor of less than 25% and a total ultraviolet transmission of less than 5%.

9. The grey soda-lime glass according to claim 8, wherein the sheet of glass is placed in a sunroof of a motor vehicle.

10. The grey soda-lime glass according to claim 6, wherein the sheet of glass is placed in a sunroof of a motor vehicle.

11. The grey soda-lime glass according to claim 1, wherein the soda-lime glass comprised of conventional glass-forming constituents is comprised of:

from 60 to 75 weight percent of $SiO_2$;
from 10 to 20 weight percent of $Na_2O$;
from 0 to 16 weight percent of CaO;
from 0 to 10 weight percent of $K_2O$;
from 0 to 10 weight percent of MgO;
from 0 to 5 weight percent of $Al_2O_3$;
from 0 to 2 weight percent of BaO;
from 10 to 20 weight percent of a mixture consisting essentially of BaO, CaO, and MgO; and
from 10 to 12 weight percent of a mixture consisting essentially of $K_2O$ and $Na_2O$.

12. The grey soda-lime glass according to claim 11, wherein the grey soda-lime glass has a thickness ranging from to 12 mm.

13. The grey soda-lime glass according to claim 12, wherein the grey soda-lime glass has a thickness ranging from 3 to 5 mm.

14. Grey soda-lime glass having a dark grey color, comprising:

soda-lime glass comprised of conventional glass-forming constituents; and coloring agents comprised of iron, cobalt, selenium, and chromium in amounts, based on the weight of the glass, of:

from 0.57 to 0.70%% of $Fe_2O_3$;
from 0.017 to 0.020% of Co;
from 0.005 to 0.008% of Se; and
from 0.016 to 0.020% of $Cr_2O_3$, wherein the glass has light transmitting properties including a light transmission factor (TL) which ranges between 16 and 22% for a glass thickness of 5 mm, and an excitation purity (P) of less than 6%.

15. The grey soda-lime glass according to claim 14, wherein the glass has a total light transmission, measured for a glass thickness of 4 mm with illuminant A (TLA4), which ranges between 20 and 25%.

16. The grey soda-lime glass according to claim 14, wherein the glass has a total energy transmission, measured for a thickness of 4 mm (TE4), which ranges between 30 and 35%.

17. The grey soda-lime glass according to claim 14, wherein the glass is a sheet of glass.

18. The grey soda-lime glass according to claim 17, further comprising a coating layer consisting of at least one metal oxide provided on at least one surface of the sheet of glass to provide a coated glass sheet.

19. The grey soda-lime glass according to claim 18, wherein the coated glass sheet has, for a coated glass sheet thickness of 4 mm, a light transmission factor of less than 15% (illuminant C), an energy transmission factor of less than 25%, and a total ultraviolet transmission of less than 5%.

20. The grey soda-lime glass according to claim 19, wherein the sheet of glass is placed in a sunroof of a motor vehicle.

21. The grey soda-lime glass according to claim 17, wherein the sheet of glass is placed in a sunroof of a motor vehicle.

22. The grey soda-lime glass according to claim 14, wherein the soda-lime glass comprised of .conventional glass-forming constituents is comprised of:

from 60 to 75 weight percent of $SiO_2$;
from 10 to 20 weight percent of $Na_2O$;
from 0 to 16 weight percent of CaO;
from 0 to 10 weight percent of $K_2O$;
from 0 to 10 weight percent of MgO;
from 0 to 5 weight percent of $Al_2O_3$;
from 0 to 2 weight percent of BaO;
from 10 to 20 weight percent of a mixture consisting essentially of BaO, CaO, and MgO; and
from 10 to 12 weight percent of a mixture consisting essentially of $K_2O$ and $Na_2O$.

23. The grey soda-lime glass according to claim 22, wherein the grey soda-lime glass has a thickness ranging from 2 to 12 mm.

24. The grey soda-lime glass according to claim 23, wherein the grey soda-lime glass has a thickness ranging from 3 to 5 mm.

* * * * *